Patent 3,071,482

NACREOUS MATERIAL FROM TITANIUM DIOXIDE

Harold A. Miller, Forest Hills, N.Y., assignor to Francis Earle Laboratories, Inc., Peekskill, N.Y., a corporation of New York
No Drawing. Filed Feb. 27, 1959, Ser. No. 795,982
14 Claims. (Cl. 106—148)

This invention relates to the utilization of platelets or lamellae of titanium dioxide or hydrated titanium dioxide in nacreous compositions.

Nacreous preparations are used to impart a pearly or mother-of-pearl appearance to various objects. For example, simulated pearls are manufactured by coating glass or plastic beads with a suspension of nacreous pigment in an appropriate vehicle, such as cellulose nitrate lacquer. Simulated mother-of-pearl knife handles and fountain pen barrels can be made incorporating nacreous pigment in a plastic, such as cellulose acetate, which is then molded into the appropriate shape. Pearl sheets are made by casting polymerizable resins, such as acrylic or polyester resins, in which nacreous pigments are suspended; the sheets can be cut into disks for the manufacture of simulated pearl buttons.

A widely used nacreous pigment is Pearl Essence, which is a suspension of the plate-like guanine crystals derived from certain fish scales. Other nacreous pigments consist of suspensions in suitable vehicles of crystals of lead hydrogen phosphate or basic lead carbonate.

These materials all have certain physical characteristics in common: They consist of transparent or translucent plate-like crystals, two microns or less in thickness, which have high indices of refraction, and which, to be of practical use, are relatively insoluble in water and in the organic liquid compositions utilized in plastics work. They also should have melting or decomposition points which are high in comparison with the temperature encountered in plastics processing.

When such crystals are incorporated in a transparent or translucent base and oriented into parallel layers, light is reflected simultaneously in a given direction from a multitude of surfaces, producing the type of luster which is characterized as pearly. The orientation is made possible by the plate-like character of the crystals. Inasmuch as the intensity of the reflectance at a boundary between two transparent substances depends on the difference in index of refraction, it is necessary that the index of refraction of the crystal deviate from that of the medium. Generally, a suitable nacreous effect begins to appear when the index of refraction of the medium and that of the crystal differ by approximately 0.2 and improves as the difference increases.

In practice the commonly used resins and plastics have indices of refraction close to the range 1.50 to 1.60, and the nacreous crystals have indices above 1.70. The indices for lead hydrogen phosphate crystals, for example, are 1.86, 1.83 and 1.81, while those for basic lead carbonate crystals are 2.09 and 1.94.

In accordance with the present invention, it has been found that titanium dioxide platelets may be made to give a nacreous effect and that such a nacreous material will have many advantages over the conventional crystalline nacreous products, having lower solubility in most solvents and chemicals, high stability at elevated temperatures, and less sensitivity to methods of handling.

Accordingly, it is an object of the present invention to provide a nacreous material of titanium dioxide having desirable physical and chemical properties, not heretofore attainable in prior art compositions.

Another object of this invention is to provide a nacreous coating or other nacreous composition utilizing titanium dioxide platelets.

Another object is to provide a resinous body or other article of manufacture having incorporated therewith a nacreous composition utilizing titanium dioxide platelets.

Still another object of the present invention is to provide a method for preparing a nacreous composition of titanium dioxide platelets.

These and other objects of the present invention will become more apparent when taken in connection with the following description.

Although the conventional nacreous substances described above are crystalline, the nacreous effect can be obtained without the use of crystalline materials, so long as the individual particles are sufficiently thin platelets with a suitable index of refraction. When lamellae of primarily amorphous titanium dioxide of dimensions similar to those of the nacreous crystals hereinbefore referred to were prepared and incorporated in a vehicle, these amorphous platelets had a pearly luster like that of the known nacreous pigments. The usual pearly effects were obtained both by coating surfaces with these platelets and also by incorporating the platelets in transparent plastic compositions.

A convenient method for forming the platelets involves first depositing an extremely thin film of tetraalkyl titanate which is then permitted to hydrolyze to titanium dioxide by the action of water vapor in the atmosphere. The film thickness should be two microns or less. These dimensions include films which exhibit an iridescent effect, i.e. show interference colors. The film is then stripped from the surface on which it was deposited and is converted to platelets, this process being effected conveniently by suspending the film in water or other liquid, where it can be broken down by violet agitation or by grinding in any suitable device, such as a ball mill.

Among the organic esters of tetravalent titanium which are suitable sources of the titanium dioxide film are tetraethyl titanate, tetraisopropyl titanate, tetrabutyl titanate, tetra-2-ethylhexyl titanate and tetraoctyl titanate. Generally lower alkyl esters containing up to about 12 carbon atoms may be used, with those containing 2 to 6 carbon atoms being preferred. In the presence of moisture, these esters hydrolyze so as to produce an alcohol and a titanium dioxide, in accordance with the following reaction:

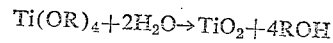

$$Ti(OR)_4 + 2H_2O \rightarrow TiO_2 + 4ROH$$

The titanium dioxide is amorphous, and may contain some water of hydration. Nevertheless, its index of refraction is greater than 1.9.

The lower members of the series, such as the tetraethyl and tetraisopropyl titanates, hydrolyze fairly rapidly, while higher members hydrolyze more slowly. Thus a choice of esters, or combinations of two or more, are possible for particular applications to control the rate of formation of the film. The compounds with lower molecular weight, such as the tetraisopropyl and tetrabutyl esters, are convenient when it is desired to perform the hydrolysis at room temperature.

In utilizing the hydrolysis of the titanium ester for the production of titanium dioxide film in accordance with this invention, the ester is dissolved in an appropriate organic solvent, and applied as a film to a clean surface. There is great latitude in the choice of solvent, since the tetra-alkyl titanates are soluble in a wide variety of organic solvents. The surface in question can be of metal, glass, or of thermoplastic or of thermosetting resinous materials, or may consist of a lacquer coating over any smooth surface. The solution can be dipped, sprayed, brushed onto the surface, or applied by any of the conventional coating techniques.

The concentration of ester in the coating solution is determined by the thickness of titanium dioxide film which is desired. The concentration generally falls within the range of 1 to 30%, and most conveniently, 3 to 5% tetraalkyl titanate. It is often found preferable to use a concentration in the lower portion of the range and to apply multiple coats, rather than to attempt to achieve the desired film thickness with a single coating. The building of the film in a more gradual manner generally assists in attaining a transparent rather than a whitish, more opaque film.

The nature of the solvent is largely determined by the properties of the surface to be coated. It is generally desirable to choose a solvent which has a strong tendency to wet the surface in question uniformly, but which does not attack or dissolve the surface to be coated, as would be the case in certain plastic-solvent or lacquer-solvent combinations. Uniform coating can often be achieved by the addition of surface active agents, or by the use of a higher ester, such as the tetrastearyl titanate, which has some wetting activity of its own.

The volatility of the solvent or solvent mixture must also be considered. If the solvent has too high a rate of evaporation, the coated surface is rapidly cooled. The atmospheric water vapor which condenses at the cool surface may cause the titanium dioxide film to become opaque, or "blush." If the volatility is too low, drying requires an inconveniently long time. If the volatility of the compound formed by hydrolysis of the titanium compound is relatively low, a somewhat elevated temperature in the drying may be desirable. To avoid the appearance of chalkiness in the film because of high relative humidity, especially where ambient temperature conditions are employed, the relative humidity should be below 60% and preferably about 50% or less. On the other hand, since the reaction depends on hydrolysis and water vapor from the atmosphere is required, the relative humidity should not be too low; relative humidities below 20%, for example, would entail an inordinately long time period for film formation. Thus relative humidities between 20 and 50% are quite adequate, especially in the preferred ambient temperature range of approximately 10° C. to 35° C.

Hydrolysis takes place rapidly, and the films are formed and hydrolyzed, using the solvents which will be described in the examples below, within a period of 2 to 20 minutes. Thus, it is not necessary to use forced air or elevated temperatures, although the process can be made even more rapid by the use of higher temperature up to about 120° C. with the appropriate relative humidity.

Under some conditions the clear film of amorphous titanium dioxide cracks and crazes when hydrolysis is complete, and is thus easily separated from the base material simply by scraping off. With thinner films, the use of a lacquer coating is particularly convenient: if the hydrated titanium dioxide film is formed on a thin lacquer coat, the entire system can easily be removed, either by soaking in water and stripping away from the permanent base material, or by dissolving the lacquer film in an appropriate solvent. This method is particularly convenient for large scale production, where an endless belt is coated first with a suitable lacquer and then with the tetraalkyl titanate solution. It is then sent through a suitable drying and hydrolyzing region and is stripped by one of the methods described above, at which point the belt is returned to its starting position in the cycle.

When this lacquer coating method is used, it is necessary to choose a lacquer material which is compatible with the end use for which the platelets are intended. If the nacreous titanium dioxide is to be used in coating simulated pearls, for example, nitrocellulose is a suitable coating material, since nacreous pigments are commonly applied to simulated pearls from nitrocellulose lacquers. On the other hand, if the titanium dioxide platelets are to be incorporated in a casein plastics, methyl cellulose makes a suitable substrate material.

As was indicated above, the film is conveniently broken into platelets of the desired dimensions by being suspended in a liquid which is then agitated violently or put through a suitable fragmenting device. Samples are withdrawn from the suspension at frequent intervals and examined by means of the microscope to determine the size of the fractured particles. The process is stopped when the titanium dioxide film has been reduced to platelets whose long dimension falls preferably between 2 and 100 microns. It is further desired that the ratio of length to thickness be at least 4. Thus, particles of 2 microns length are suitable if they are 0.5 micron or less in thickness, but platelets 2 microns thick should be at least 8 microns long. Although lengths of 2 to 100 microns produce optimum luster, lamellae which are even smaller than 2 microns in length are suitable if the particles are thin enough, the main criterion being that the crystals remain platelets, which, as indicated above, may be considered to be the case if the ratio of length to thickness is four or greater. If during the fragmenting process some small particles with a lower ratio of length to thickness are produced, they dilute but of course do not destroy the nacreous effect of the more desirable platelets.

Platelets longer than 100 microns also produce pearly luster, but are less desirable for many purposes, because individual particles can be detected by the eye, giving a discontinuous optical effect.

The resulting suspension of titanium dioxide platelets has the typically silky appearance of nacreous suspensions. It is heterogeneous with respect to platelet area and platelet thickness. If desired, the lamellae can be fractionated into more uniform size ranges by settling and decantation or by centrifuging. The thinner particles which are the most lustrous per unit weight of titanium dioxide since they present the greatest number of reflecting surfaces, are very well suited to an application like the surface coating of simulated pearls, while the somewhat thicker platelets are preferable in plastic molding operations where the greater rigidity of the particles prevents their being fractured further by agitation in the viscous plastic.

The hydrated, amorphous titanium dioxide platelets have many properties which make them ideal for utilization in nacreous compositions. They have an index of refraction of at least 1.9, are relatively insoluble in most chemicals, and have high temperature stabilities so that they can be incorporated in plastic molding operations without degradation. Moreover, they are chemically inert and, therefore, unreactive with the various media in which they would be suspended. It is possible further to improve the quality of the platelets by heating them to a high temperature, preferably in the range 300° C. to 800° C. During this operation the relatively amorphous titanium dioxide platelets become more crystalline without losing their gross morphological structure. As a result, the particles remain in the form of platelets of the desired dimensions, but are increased in refractive index to the range 2.4 to 2.9. This increase in refractive index produces an increase in light reflectivity.

Another consequence of this heat treatment is that any residual organic material from the hydrolysis reaction or from a lacquer film substrate is oxidized and volatilized with the result that the platelets then are compatible with any medium in spite of the particular lacquer substance on which they may have originally been deposited. In spite of the advantages of the heat treatment, however, this additional operation is by no means essential to the utility of the invention.

The nature of the invention is most readily described by means of a number of examples, which follows:

*Example I*

A 20% solution of tetrabutyl titanate in benzene was prepared. A thoroughly cleaned glass plate measuring 3 feet by 4 feet was vertically immersed into the solution at room temperature in an atmosphere with a relative humidity of between 40 and 50%. The plate was slowly withdrawn from the solution and permitted to hang above the dip tank for ten minutes. The dipping process was repeated twice. Each time a hard film formed on the surfaces of the glass plate. However, by the third coat the films cracked and flaked, and could easily be scraped from the glass with a spatula. The films, approximately 0.5 micron in thickness were taken up in approximately 100 ml. of butyl acetate, the suspension then being violently stirred until the platelets had an average long dimension of 50 microns. The platelets were permitted to settle out of the butyl acetate, which was decanted for further use, leaving a paste consisting of 25% titanium dioxide in butyl acetate. To this paste was added 24 times its weight of a lacquer consisting of 8.0% cellulose nitrate (15–20 seconds) in butyl acetate. The resulting pearl lacquer was then used for coating alabaster glass beads by dipping, thus making simulated pearl beads. In the above example, it is to be noted that the platelet comprises 25% by weight of the paste composition. Actually this composition may vary in accordance with the convenience of the user, so that the desired ultimate platelet concentration in the final coating composition is in the range of about 0.25% to 5.0%.

Example II

Titanium dioxide film approximately 200 millimicrons in thickness was prepared by immersing a glass plate 3 feet by 4 feet in a solution containing 10% tetraisopropyl titanate and 1% Aerosol OT in ethylene glycol monomethyl ether under the atmospheric conditions described in Example I. Two coats were required, 10 minutes drying being allowed in each case. The dried plate was allowed to soak in water to loosen the film, which was then scraped off and washed into a small volume of water. The plates were fragmented to an average long dimension of 35 microns by the procedure of Example I and were then collected by decantation and dried. The titanium dioxide platelets (1.0 part) were suspended in 100 parts of polyester casting resin, and the mixture was cast to produce a pearl sheet suitable for cutting into polyester pearl buttons.

Example III

A clean rectangular glass plate 3 feet x 4 feet was immersed in a dilute lacquer solution consisting of 2% of ½ second cellulose nitrate in butyl acetate. The glass plate was as slowly withdrawn and the lacquer film permitted to dry, after which the coated plate was coated twice with a 10% solution of tetrabutyl titanate in mineral spirits. After drying and hydrolyzing as in Example I, the plate was immersed in water for about one hour, after which the lacquer film containing the titanium dioxide film was easily stripped from the plate. The collected nitrocellulose film was rinsed with ethyl alcohol to remove water, and was then dissolved in a small amount of butyl acetate. The titanium dioxide film, approximately 100 millimicrons thick, was fragmented to an average particle size of 50 microns. The titanium dioxide platelets were then collected by centrifugation and incorporated in nitrocellulose dipping lacquer for application to simulated pearl beads as in Example I.

Example IV

A glass plate as in Example I was dipped into a 30% solution of tetra-2-ethylhexyl titanate in ethylene glycol monoethyl ether. The plate was dried with forced air at an average temperature of 150° F. and a relative humidity of 25%. The dried film was thick enough to flake after a single operation because of the relatively high viscosity of the dipping solution, and was washed down into a small quantity of water for fragmentation to platelets approximately 70 microns in length. The dried platelets (0.5 part) were then incorporated in 100 parts of methyl methacrylate molding powder for injection molding to make methyl methacrylate pearl articles.

Example V

A glass plate was first coated with a solution of 1% gelatin and 0.2% Aerosol OT in water. It was then immersed in a 15% solution of tetraisopropyl titanate in isopropanol, a single coating giving a titanium dioxide film averaging 50 millimicrons in thickness. After drying under the conditions of Example I, the plate was scraped down in a stream of water and the film was fragmented to platelets having an average diameter of about 40 microns. The platelets of hydrated, amorphous titanium dioxide were collected by centrifugation, and heated to 700° C. for one hour. The resulting platelets had an increased index of refraction, although they retained the general dimensions of the initial unheated platelets. They were incorporated in nitrocellulose lacquer, as in Example I, for the manufacture of simulated pearls.

Example VI

A clean rectangular glass plate 3 feet by 4 feet was vertically immersed in a lacquer solution consisting of 10% by weight of polymethyl methacrylate in methyl isobutyl ketone. The glass plate was slowly withdrawn and the lacquer film allowed to dry, after which the coated plate was coated three times with a 15% solution of tetrabutyl titanate in heptane. Each time the plate is withdrawn from the solution and allowed to dry for 10 minutes. The hydrolyzed titanium dioxide film is about 0.75 micron thick. The plate is then immersed in water for several hours, and then the lacquer film, with its titanium dioxide overcoat, is stripped from the plate. The acrylic lacquer film was rinsed with ethyl alcohol to remove water, and then the film was dissolved in about 100 grams of methyl ethyl ketone. After settling, the supernatant liquid was decanted, the settled platelets were stirred vigorously to form platelets less than 100 microns long, and then the platelets were dispersed in 300 grams of a methyl methacrylate casting syrup, the crystal concentration being 0.50%. The mixture was then cast using 1.50 grams of acetyl peroxide catalyst to make a pearl polymethyl methacrylate sheet suitable for cutting into methacrylate pearl buttons.

In the foregoing, the present invention has been described only in connection with preferred embodiments thereof. Many variations and modifications of the principles of my invention within the scope of the description herein are obvious. Accordingly, the invention is to be limited not by the specific disclosure herein, but only by the appending claims.

I claim:

1. A nacreous composition, having as a nacre-producing substance therein, titanium dioxide platelets suspended in a light transmitting medium, each of said titanium dioxide platelets having a thickness not greater than about 100 millimicrons, an average ratio of length to thickness of at least four to one and an index of refraction at least 0.2 greater than that of said suspending medium.

2. The nacreous composition of claim 1, in which said platelets have lengths between 2 and 100 microns.

3. The nacreous composition of claim 1, in which the titanium dioxide platelets have an index of refraction of at least 1.9 and are suspended in a film-forming lacquer.

4. A nacreous composition, having as a nacre-producing substance therein, titanium dioxide platelets suspended in a light transmitting organic resinous material, each of said titanium dioxide platelets having a thickness of no more than about 100 millimicrons, an average ratio of length to thickness of at least four to one, a length of from 2 to 100 microns and an index of refraction of at least 1.9, said index of refraction being at least 0.2 greater than that of said light transmitting organic resinous material.

5. A light-transmitting, nacreous plastic article of manufacture having suspended therein as a nacre-producing substance therein titanium dioxide platelets having a thickness of no more than about 100 millimicrons and an index of refraction of at least 1.9, said index of refraction being at least 0.2 greater than that of the plastic.

6. An article of manufacture having thereon a nacreous coating, which has suspended therein as a nacre-producing substance, titanium dioxide platelets having a thickness of no more than about 100 millimicrons and an index of refraction of at least 1.9, said index of refraction being at least 0.2 greater than that of the coating medium.

7. The composition of claim 1 wherein the nacre-producing substance is in the form of crystalline titanium dioxide having an index of refraction of between about 2.4 and 2.9.

8. The article of claim 5 in which the plastic material is from the group consisting of acrylic resins, polyester resins and casein resins.

9. The method of preparing nacre-producing titanium dioxide platelets which comprises depositing a smooth substrate film, which is soluble in a solvent which does not dissolve said titanium dioxide platelets, on a clean surface, and, over said substrate film, a film of a solution of a lower titanium ester having alkyl groups containing up to 12 carbon atoms, removing the solvent from said solution, and hydrolyzing said film in an atmosphere having a relative humidity of between about 20 percent and 60 percent thereby forming a film having a thickness not greater than 0.75 micron, removing the substrate and hydrolyzed film from said surface, separating the substrate from the hydrolyzed film, and then fracturing said hydrolyzed film, thereby forming a nacre-producing platelets.

10. The method of preparing nacre-producing titanium dioxide platelets which comprises depositing a smooth substrate film, which is soluble in a solvent which does not dissolve said nacre-producing titanium dioxide platelets, on a clean surface, and, over said substrate film, a thin film not thicker than 0.75 micron of an organic tetra-alkyl titanate from the group consisting of tetraethyl, tetraisopropyl and tetrabutyl titanate, hydrolyzing said film to $TiO_2$ in an atmosphere having a relative humidity between about 20 percent and 60 percent at ambient temperature, removing the substrate and hydrolyzed film from the surface, separating the substrate from the hydrolyzed film, and then fracturing the hydrolyzed film by agitation in a liquid medium which is a non-solvent for the film thereby forming the nacre-producing hydrated $TiO_2$ platelets.

11. The method of claim 10 in which the hydrolysis is performed in an atmosphere maintained at a temperature between about 10° C. and 35° C. and having a relative humidity between about 20 percent and 50 percent.

12. The method of preparing nacre-producing titanium dioxide platelets which comprises depositing a smooth substrate lacquer film, which is soluble in a solvent which does not dissolve said nacre-producing titanium dioxide platelets, on a clean surface, then depositing a thin film of a tetraalkyl titanate containing up to 12 carbon atoms from a solution of said tetra-alkyl titanate over said substrate lacquer film, hydrolyzing said film to $TiO_2$ in an atmosphere having a relative humidity between about 20 percent and 60 percent and maintained between about 10° C. and 120° C., removing the substrate and the hydrolyzed film from the surface, separating the substrate film from the hydrolyzed film, and then fracturing the hydrolyzed film by agitation in a liquid medium which is a non-solvent for the film into nacre-producing platelets of a thickness not greater than 0.75 micron and an average ratio of length to thickness of at least four.

13. The method of claim 12 including the further step of increasing the refractive index of the nacre-producing $TiO_2$ platelets by heating the same to a temperature in the range of about 300° C. to 800° C.

14. The method of preparing nacre-producing titanium dioxide platelets which comprises depositing a thin film of a nitrocellulose lacquer on a clean surface, then depositing a thin film of a tetra-alkyl titanate having alkyl groups containing up to 12 carbon atoms over said lacquer film, hydrolyzing said film to $TiO_2$ in an atmosphere containing water vapor and maintained between about 10° C. and 35° C. and having a relative humidity between about 20 percent and 50 percent thereby forming a hydrolyzed film having a thickness not greater than 0.75 micron, immersing the coated surface in water, stripping the lacquer film and the hydrolyzed film from the surface, dissolving the nitrocellulose so as to separate it from the hydrolyzed film, fracturing the hydrolyzed film by agitation in a liquid medium which is a non-solvent for the film into nacre-producing platelets of a thickness not greater than 0.75 micron and an average ratio of length to thickness of at least four, and then incorporating said platelets in a nitrocellulose dipping lacquer.

References Cited in the file of this patent

UNITED STATES PATENTS

| 1,906,148 | Gardner | Apr. 25, 1933 |
| 2,941,895 | Haslam | June 21, 1960 |
| 3,018,186 | Jenkins | Jan. 23, 1962 |

OTHER REFERENCES

Sidlow: Chemical Products, June 1953, pages 215–219.